United States Patent [19]

Thomas et al.

[11] Patent Number: 4,855,565
[45] Date of Patent: Aug. 8, 1989

[54] WORK HEAD DEVICE

[75] Inventors: Bruce A. Thomas, Seaford; Gregory Sapozhnikov, Hampton; Robert L. Shaw, East Hawthorn, all of Australia

[73] Assignee: Laser Lab Limited, Cheltenham, Australia

[21] Appl. No.: 265,585

[22] Filed: Nov. 1, 1988

Related U.S. Application Data

[63] Continuation of Ser. No. 163,969, filed as PCT AU87/00083 on Mar. 25, 1987, published as WO87/05849 on Oct. 8, 1987, abandoned.

[30] Foreign Application Priority Data

Mar. 25, 1986 [AU] Australia .............................. PH 5190

[51] Int. Cl.$^4$ .............................................. B23K 26/02
[52] U.S. Cl. .............................................. 219/121.79
[58] Field of Search .................... 219/121.78, 121.79, 219/121.74, 121.8, 121.6, 121.85, 121.63, 121.64, 121.67, 121.72

[56] References Cited

U.S. PATENT DOCUMENTS

| | | | |
|---|---|---|---|
| 3,247,978 | 4/1966 | Newmeier | 414/8 |
| 3,780,571 | 12/1973 | Wiesener | 73/67.5 |
| 4,160,894 | 7/1979 | Stemmler | 219/121.85 X |
| 4,239,431 | 12/1980 | Davini | 414/4 X |
| 4,273,506 | 6/1981 | Thomson et al. | 414/735 |
| 4,299,533 | 11/1981 | Ohnaka | 424/752 |
| 4,353,677 | 10/1982 | Susnjara et al. | 414/4 X |
| 4,367,017 | 1/1983 | Jimbou et al. | 219/121 LV X |
| 4,367,532 | 1/1983 | Crum et al. | 764/513 |
| 4,425,818 | 1/1984 | Asada et al. | 414/4 X |
| 4,518,308 | 5/1985 | Grzybowski et al. | 414/735 |
| 4,539,462 | 9/1985 | Plankenhorn | 219/121.79 |
| 4,542,278 | 9/1985 | Taylor | 219/121.79 |
| 4,552,504 | 11/1985 | Nakada et al. | 414/735 |
| 4,563,567 | 1/1986 | Geffrey et al. | 219/121.78 |
| 4,694,139 | 9/1987 | Röder | 219/121 LU |
| 4,698,479 | 10/1987 | Rando et al. | 219/121 LU X |

FOREIGN PATENT DOCUMENTS

| | | | |
|---|---|---|---|
| 1351483 | 11/1983 | Australia . | |
| 2547384 | 9/1984 | Australia . | |
| 0090054 | 4/1983 | European Pat. Off. . | |
| 0154865 | 8/1985 | European Pat. Off. . | |
| 0178011 | 8/1985 | European Pat. Off. . | |
| 0180565 | 5/1986 | European Pat. Off. . | |
| 0185233 | 6/1986 | European Pat. Off. | 219/121 LU |
| 3022173 | 12/1981 | Fed. Rep. of Germany . | |
| 3400017 | 8/1985 | Fed. Rep. of Germany . | |
| 3445981 | 6/1986 | Fed. Rep. of Germany . | |
| 59-107785 | 6/1984 | Japan . | |
| 781465 | 8/1957 | United Kingdom . | |
| 2135230 | 8/1964 | United Kingdom . | |
| 2153785 | 8/1965 | United Kingdom . | |
| 2172535 | 9/1965 | United Kingdom . | |
| 2041811 | 9/1980 | United Kingdom . | |
| 2134071 | 8/1984 | United Kingdom | 219/121.24 |

Primary Examiner—C. L. Albritton
Attorney, Agent, or Firm—Merchant, Gould, Smith, Edell, Welter & Schmidt

[57] ABSTRACT

A work head (10) has a base member (12) which is connectable to carrier means (30) of a machine for lateral movement of the work head (10) parallel to an X-Y plane of a three-axes co-ordinate system, for longitudinal movement of work head (10) parallel to the Z-axis of that system and for rotating work head (10) on an A-axis parallel to the Z-axis; link means (14) connected to base member (12) so as to pivot relative thereto on a B'-axis parallel to the X-Y plane; a work member (16) connected to link means (14) so as to pivot relative thereto about a B"-axis spaced parallel to the B'-axis. Work member (16) defines a path by which a work medium is able to pass from a source to an outlet defined at a work end (52) of work member (16). Drive means (64,66) is operable to pivot each link means (14) and work member (16), on its axis, but in opposite directions and with the work member (16) pivoting through twice the angle of pivoting of link means (14) relative to base member (12).

21 Claims, 6 Drawing Sheets

U.S. Patent  Aug. 8, 1989  Sheet 1 of 6  4,855,565
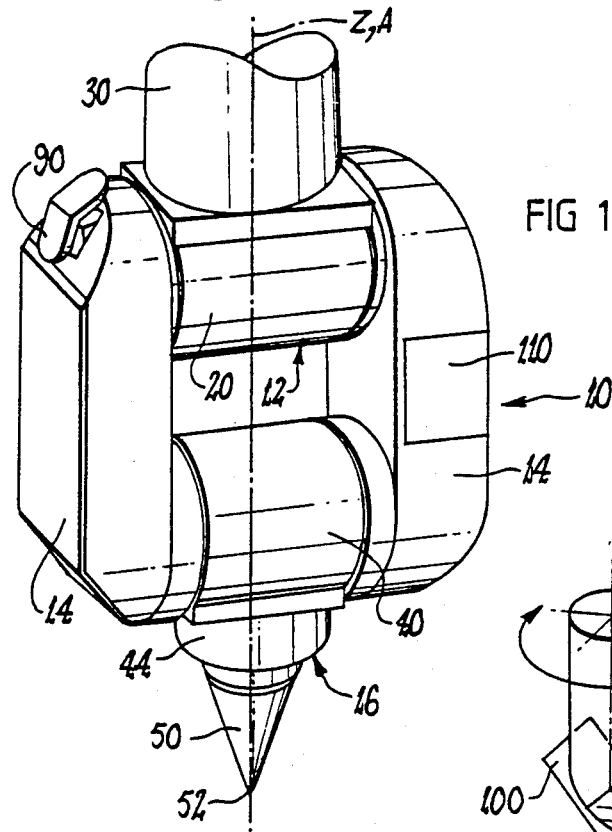
FIG 1
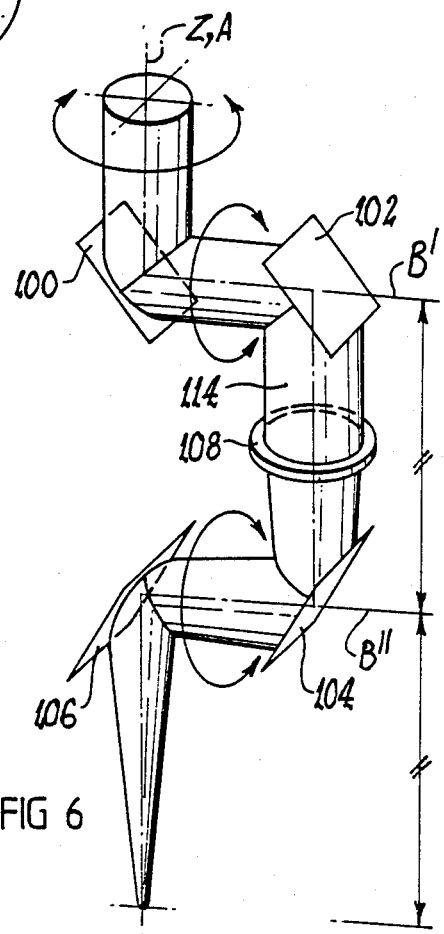
FIG 7
FIG 6

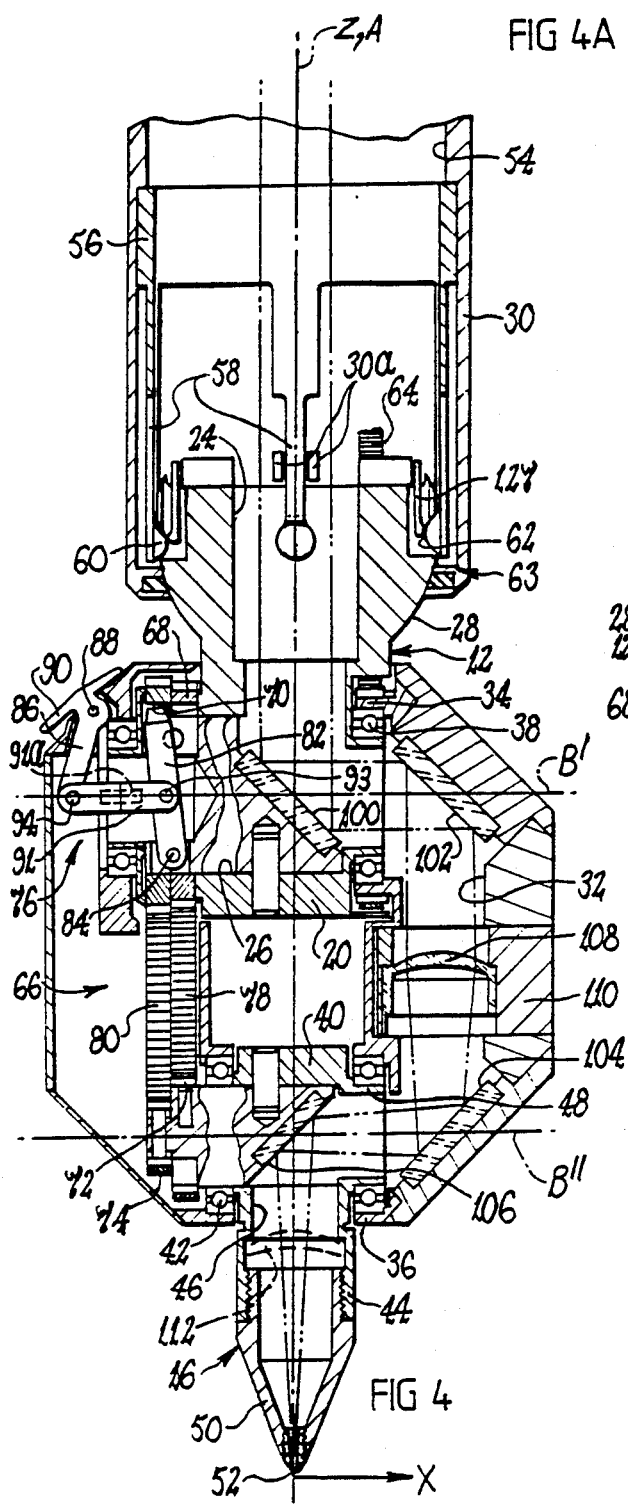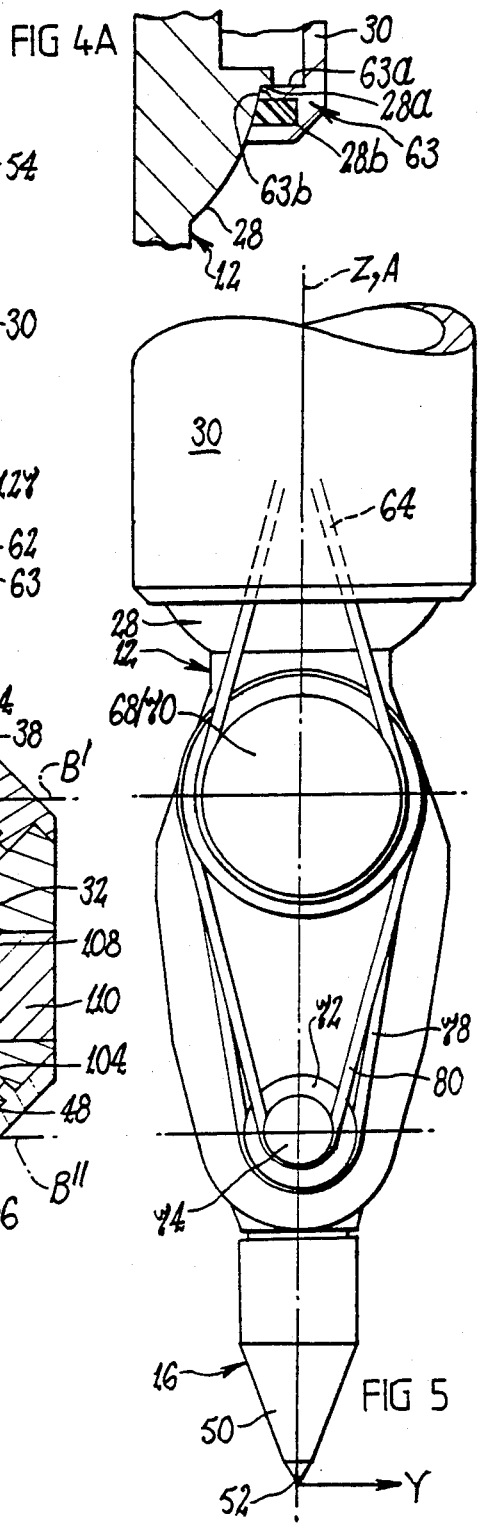

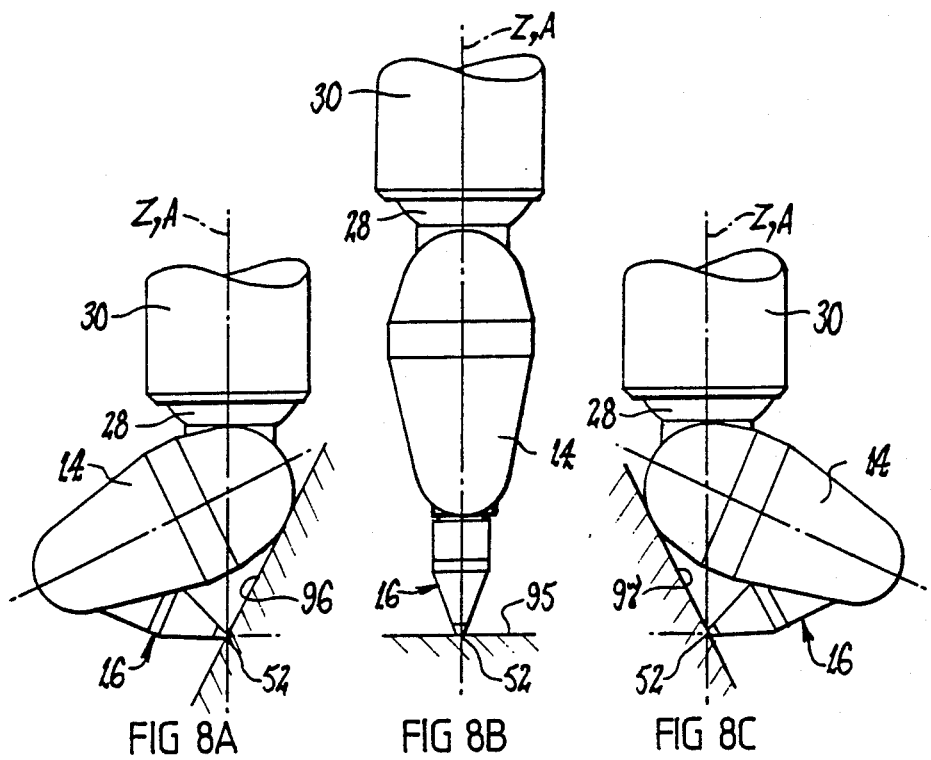
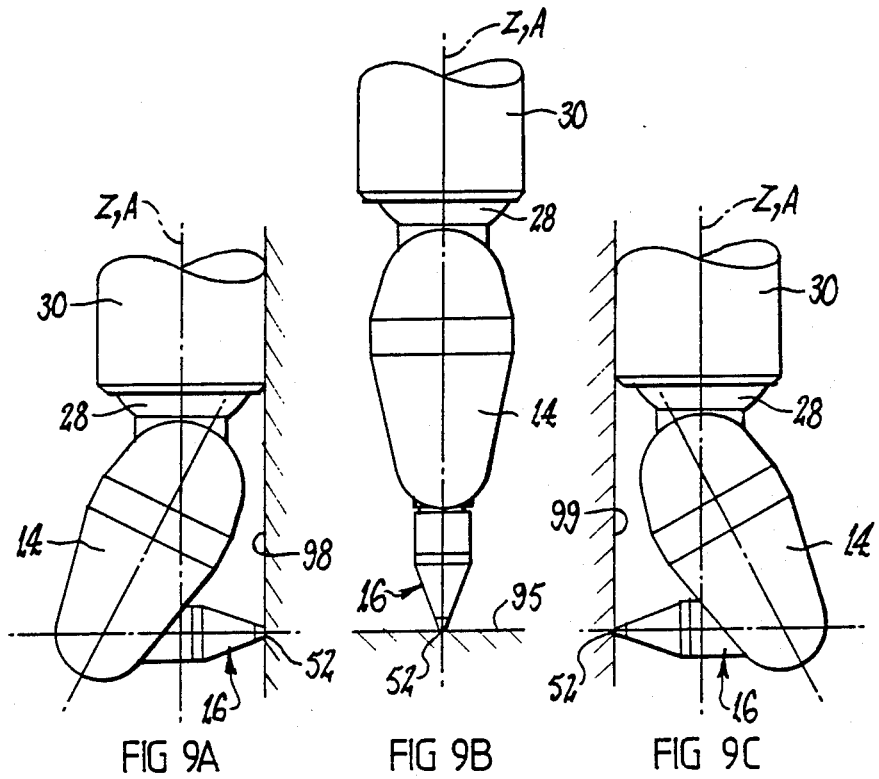

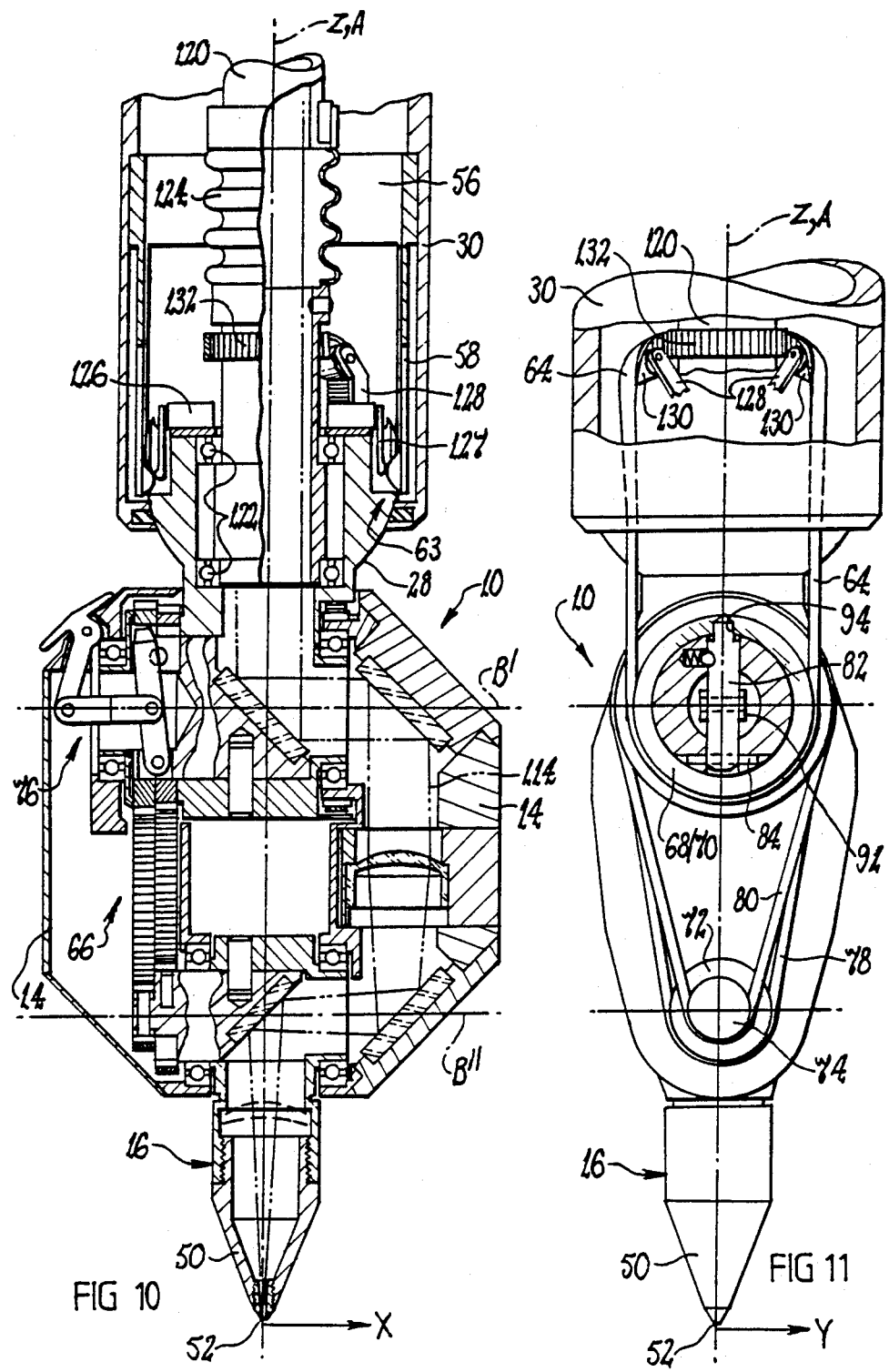

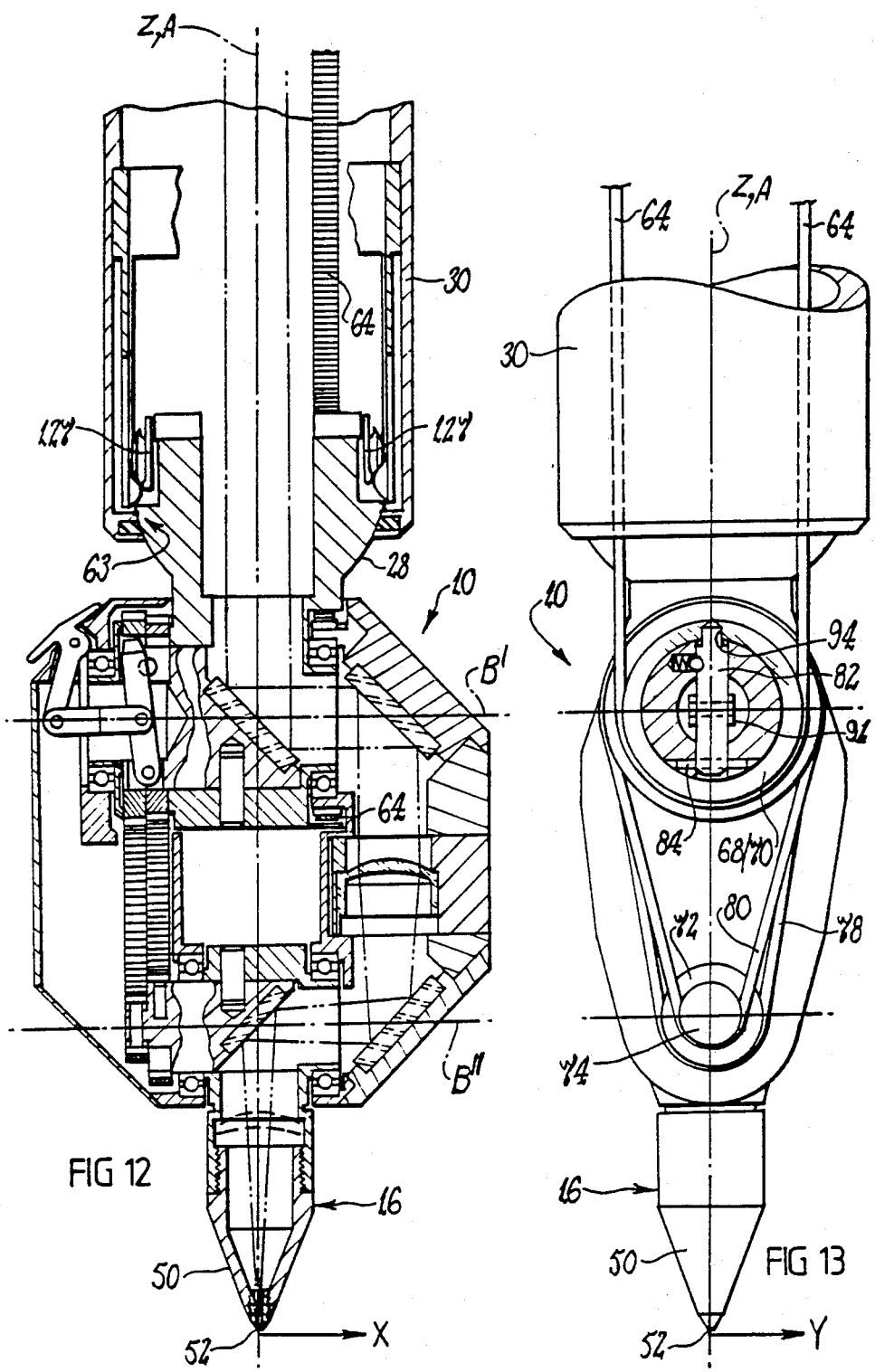

WORK HEAD DEVICE

This is a continuation of application Ser. No. 163,969, filed as PCT AU87/00083 on Mar. 25, 1987, published as WO87/05849 on Oct. 8, 1987, now abandoned.

This invention relates to an improved work head, and in particular a work head suitable for use in automated machinery such as programmable machine-tools and systems.

The work head is particularly suited for adaptation for use as the work head in a laser cutting or welding system. While primarily described with reference to that application it is to be appreciated that the work head can be adapted for use in other forms of machinery. Thus, for example, the work head can be as the work head in a plasma cutting machine, a water jet cutting machine, or a glue applicator machine.

In some laser machining systems, there is used what is referred to as a five axes arrangement enabling movement of a work head of the system for performing a programmed laser cutting or welding operation on a workpiece. In such systems, the work head typically is mounted at one end of an elongated carrier arm through which a laser beam is able to pass to the head. The carrier arm is movable longitudinally, or able to telescope, to move the work head along the Z-axis; such axis typically being vertical. The carrier arm is mounted for lateral movement in one or both of two directions at right angles to the Z-axis, to move the work head along the X- and Y-axes; such axes typically being horizontal. Each of the other two axes of the five axes arrangement is an axis of rotation; the first, or A-axis, being on axis of rotation co-incident with the Z-axis, and the second, or B-axis, being parallel to, but spaced from, a plane containing the X- and Y-axes and passing through the Z-axis. Typically, rotation on the A-axis is through 360°, while rotation through the B-axis is through 180°.

The laser beam, which passes to the work head along the carrier arm, emerges from a nozzle of the work head after being focused by a lens within that head and forming part of an optical arrangement within the system. A stream of a normal temperature pressurising gas is used to prevent contamination of the optical arrangement and a stream of a normal temperature cutting assist gas emerges from the nozzle orifice. The focussing lens and mirrors of the workhead usually are cooled with water. Due to the need for rotation on the B-axis, the beam is unable to pass in a straight line along the Z-axis. Rather, the beam must be reflected from the Z-axis along the B-axis, and then be again reflected along a line parallel to, but off-set from, the Z-axis. Usually, the work head has two parts which are pivotally inter-connected for relative rotation on the B-axis, a first part being stationarily connected to the carrier arm and a second part being pivotable on the first part, relative to the carrier arm. As a consequence of these factors, rotation of the work head on the A-axis results in the nozzle and the laser beam issuing therefrom traversing a circle around the Z-axis; while rotation on the B-axis results in the nozzle and beam rotating in a plane spaced from, rather than one containing, the Z-axis. An important constraint, limiting or complicating use of the laser beam, arises from the off-set of the laser beam from the Z-axis.

The main constraint imposed on operation of such five axes arrangement by offset of the laser beam is one of required speed of movement in the X-Y plane, as can be illustrated by a simple example. When cutting off a round top of a mushroom-like boss of a workpiece, the offset is necessarily directed radially inward, to the centre of the boss from the Z-axis. During a complete revolution the cutting tip of the head moves with the required cutting speed along the circumference of the hole being cut while, due to the radial offset, the Z-axis is moving along the circumference of a greater diameter. The time of revolution being the same, much higher circular speed in X-Y plane is required for the carrier arm and carrier with the curvature raduises on workpieces frequently being very small, and the off-set value very substantial in comparison (about 100 to 150 mm in known arrangements), the required cutting speed cannot be achieved because of a limit to the maximum resultant speed in X-Y plane.

The present invention provides an improved work head for a laser robotic system or for other applications. The workhead of the invention has a base member connectable to a carrier means, such as a carrier arm; link means connected to the base member so as to be pivotable thereon about a first axis; and a work member connected to the link means so as to be pivotable thereon about a second axis which is substantially parallel to the first axis; the link means and work member being adapted to be pivoted relative to the base member and the link means, respectively. The work head preferably includes at least part of drive means by which such pivoting is effected simultaneously.

In relation to the five-axes system as described above, the carrier means preferably is movable for varying the position of the work head of the invention relative to the X- and Y-axes. Also, the carrier means or the connection between it and the base member preferably enables movement of the work head relative to the Z-axis and its rotation on the A-axis. For rotation of the work head corresponding to what is referred to as rotation on the B-axis, there preferably is respective rotation of the link means on the first axis, and of the work member on the second axis; with the first being perpendicular to and passing through the Z-axis and the second axis being parallel to the first axis. Thus, each of the first and second axes is similar to the B-axis of the above-described, five axes arrangement and, for ease of reference, they will hereinafter be referred to as the B'- and B"- axis, respectively.

In normal use of the work head of the invention, the end of the work member remote from the link means hereinafter referred to as the work end, is adapted to pass across a workpiece on which an operation is to be performed by a system or machine of which the work head is to form or forms a component. Thus, in the case of a laser system, the work member may include a nozzle which defines the work end and from which a laser beam emerges to contact the workpiece for performing a cutting, marking or welding operation. Alternatively, where the work head is used for example in a glue applicator machine, the work member may include a nozzle which defines the work end and from which glue issues for application to the workpiece. Similarly, where the work head is used in a plasma or water jet cutting machine, the work member may include a nozzle which defines the work end and from which a plasma or water jet issues for application to the workpiece.

The work head most preferably is such that, at least in one working condition, a substantially zero offset feature, also known "one point steering" feature, is maintained. By zero offset feature, or zero offset, it is meant hereinafter that, despite rotation on the A-, B'- and B"-axes, the work end remains substantially on the Z- axis. For this, the spacing between the B'- and B"- axes substantially equals that of the work end from the B"-axis. Also, when the Z-, B'-and B"-axes are co-planar, the work end is substantially centered on the Z-axis. Additionally, the drive means is operable to cause rotation of the work member on the B"-axis, relative to the link means, which is opposite in direction to rotation of the link means, on the B'-axis relative to the base member, and with such that the angle of rotation of the work member in relation to the link means is twice the angle of rotation of the link means in relation to the base member. Thus, a drive ratio of 2:1 is provided.

With such zero offset, use of the work head is facilitated in many applications. In particular, while the work head is performing a required sequence of movements under conditions in which the work end of the work head maintains a constant machine speed relative to a surface of a workpiece on which an operation is performed during that sequence, the carrier means maintains the same constant speed (within Z-axis movement influence) in the X-Y plane resulting from combined movement with respect to the X- and Y-axes. In addition, movement or rotation on the respective axes is simplified while, in use of the work head in an automated machine or programmable robotics system, programming of control means for the work head to cause the work head to perform a required sequence of movements is simplified.

At least in one form of the invention, the work head is capable of being used in at least two conditions. In such case, substantially zero offset is maintained in a first of those conditions, with a given offset or a respective given offset being maintained in the or each other condition and the work head being adjustable from one condition to another. A variety of alternatives are possible to enable the work head to be so adjustable. However, one preferred alternative is to modify the length of the work member to change the distance of the work end from the B"-axis. A second preferred alternative is to adjust the drive means such that it is operable to cause the angle of rotation of the work member relative to the link means on the B"-axis which is not twice the value and opposite the angle of rotation of the link means relative to the base member on the B'-axis. In a third alternative, the drive means can be adjusted such that the respective rotation on each of the B'- and B"- axes, whichever the ratio of rotation angles had been chosen, is in the same direction. In further alternatives, the first and second or first and third alternatives can be combined. However, in each alternative, utility of the work head can be enhanced under some circumstances, such as in enabling it to perform a sequence of movements over a surface of a workpiece which is parallel with, or sloped slightly with respect to, the Z-axis.

Where the work head is for use in a laser system, the laser beam preferably passes along the Z-axis, through the base member, to the B'-axis. The beam then preferably is reflected along the B'-axis to a first plane which is substantially normal to the B'- and B"-axes but spaced from the Z-axis, and again reflected to pass in that first plane, through the link means, to the B"-axis. At the B"-axis, the beam preferably again is reflected, along that axis, to a second plane substantially parallel to the first plane and containing the Z-axis. At the second plane, the beam is further reflected into that plane so as to pass along the work member and emerge from the work end of the work head. For such reflection of the laser beam, there preferably is a first and a second pair of mirror elements; the elements of the first pair being spaced along, and at substantially 45° to, the B'-axis; the elements of the second pair being similarly positioned, but oppositely inclined, with respect to the B"-axis. A first element of the first pair extends across the Z-axis, and a first element of the second pair extends across the second plane; while the second element of each pair extends across the first plane. At least in one form of the invention, a focussing lens for the laser beam is located within the link means of the work head, between the mirror element of each pair which extends across the first plane; that is, between the second elements. However, in another form of the invention, a focussing lens can be located within the work member of the work head, intermediate the first mirror element of the second pair and the work end of the head.

Where the work head is for use other than in a laser system, an arrangement analogous to that detailed in the preceding paragraph for the laser beam can be used. Thus, in the case of a work head for use in a glue applicator machine, a flow path for glue corresponding to the light path for the laser beam can be defined by a glue supply tube extending through the work head. Similarly, where the work head is for use in a plasma or water jet cutting machine, the plasma or water jet can pass through the work head to the work end of the work member, along a line corresponding to such light path. However, as such supply tube or line is not subject to the constraints applicable to a light beam, such as a laser beam, which necessitates a light path which is linear or of linear sections, other arrangements are readily available in alternative machines or systems such as glue applicator or plasma or water jet cutting machines. That is, a more direct path can be provided in such machines, by a flexible tube or line communicating with the work member, due to their ability to bend or flex as required with change in relative positions of the link means and work member of the work head.

The base member of the work head may be adapted to be connected to carrier means in a variety of ways. A selection between these depends in part on whether the work head is rotatable with, or relative to, the carrier means in being rotated on the A-axis. However, in either case, the base member in one form has a sleeve portion which is substantially concentric with the B'- axis, and a tubular shank portion extending laterally from sleeve portion and substantially concentric with the Z-axis. In such form, the shank portion is adapted for connection to the carrier means, while the link means of the work head is journalled on at least one end of the sleeve portion. A laser beam preferably is able to pass from the carrier means, along a bore defined by the shank portion, and into a bore defined by the sleeve portion; the respective bores being in communication at the junction of the sleeve and shank portions. The beam is reflected from the Z-axis along the B'-axis by the first mirror element of the first pair thereof being positioned within the bore of the sleeve portion.

Most conveniently, the shank portion has a part-spherical outer surface by which it is held in the carrier means. In such case, the work head may be secured in relation to the carrier means a projection on each of a plurality of resilient fingers of the carrier means locating in a respective one of a plurality of recesses provided in that surface and spaced angularly around the Z-axis. Preferably, such method of securement enables the work head to retract partly into the carrier means or to twist about the centre of spherical surface or both in the event that the work head is caused to impact unintentionally against a workpiece or other object. The retraction, intended to avoid damage resulting from such impact, preferably is permitted by the resilience of the fingers allowing their projections to ride out of the recesses, under the action of a force component along the Z-axis or torque about any axis resulting from the impact.

As a means for positioning of the head in relation to the carrier, most conveniently the spherical surface of the base member is provided with at least one datum surface or shoulder, with at least one complementary datum surface or shoulder being located on the carrier. Also, resilient fingers are situated in such a way as to retain the respective datum surfaces in contact, and at least one of the fingers has a projection in a corresponding recess in the base member; the one finger being constrained so as to fix the workhead in stable angular position with respect to the carrier means.

At least where the work head is for use in a laser system, its link means has a link portion offset to one side of a plane containing the Z-axis, hereinafter referred to as a first link. Such first link extends between the B'- and B"-axes and, for application in such system, is hollow and defines a section of the light path for the laser beam. Thus, the first link may house the second mirror element of each pair thereof which is located in the first plane. Also, where a focussing lens is located between those second elements, the lens preferably is located in the first link.

One end of the first link preferably is journalled on the base member. Where the base member is of the above-described form, having a sleeve portion and a shank portion, the first link preferably is journalled in or on one end of the sleeve portion. At its other end, the first link may be journalled in or on the work member.

The link means may have an auxilliary link portion, herein referred to as a second link, and this may be integral with or separate from the first link. That is, the link means may be of unitary form, or it may be comprised of first and second links which are distinct components. Indeed, in the latter case, those links may be inter-connected by their respective connection to at least one of the base member and the work member, rather than necessarily directly inter-connected one to the other. In the latter case, the links may be inter-connected by at least one connecting plate which does not obstruct head movement. The second link may have an overall external form which is complementary to that of the first link. Also, the links preferably are offset in an opposed relationship to respective sides of a plane containing the Z-axis along each of the B'- and B"-axes; the link means, for example, being substantially symmetrical with respect to that plane. As detailed more fully hereinafter, the second link may house part of the drive means of the work head.

As indicated above, a laser beam is able to be reflected along the B'-axis, by a mirror element in the bore of the base member sleeve portion. That reflected beam can be again reflected by the second mirror element of the first pair located in the first link. After being reflected by that second element, the beam passes along the first link to the second element of the second pair thereof; the latter element also being in the first link and further reflecting the beam, along the B"-axis.

In one form, the work member of the work head has a tubular body by which the work member preferably is pivotally connected to the link means. The work member also includes a work end portion which, at least where the work head is for use in a laser system, comprises or includes a nozzle. Such nozzle extends laterally of the tubular body portion in a plane containing the Z-axis. For such system, a bore defined by the tubular body has positioned therein the first mirror element of the second pair thereof, such that the beam reflected along the B"-axis is further reflected to pass through and emerge from the nozzle at the work end of the work head.

The nozzle may be integral with the tubular body or separable therefrom. In the latter case, the nozzle may be mountable on the tubular body in a manner enabling its replacement by an alternative nozzle of different length, or to enable a spacer member to be removed or fitted to vary the length of the nozzle and, hence, the distance between the B"-axis and the work end.

The nozzle, particularly if separable from the tubular body, may have nozzle tip mounted to it, the latter being typically of metal. The nozzle may be made of electrically isolating material, such as one enabling the use of the nozzle tip as an electrode or distance to workpiece sensor, preferably of a capacitor type.

The work member may be connected to the link member by a journal form of coupling. Where the link means comprises only a first link, such coupling can be provided at one end of the tubular body of the work member. Where the link means has first and second links, a separate such coupling can be provided between each link and a respective end of the tubular body.

The work head can be adapted for simultaneous pivoting of the link means and the work member using one of a variety of arrangements. The work head may be so adapted by being able to receive drive from a suitable drive means which has a respective drive train for the link means and the work member. However, it is preferred that the work head is adapted to receive drive from a motorized drive train operable via suitable coupling means to cause rotation of the link means on the B'-axis, with the work member being adapted to rotate simultaneously under the action of a separate motorless drive train responsive to rotation of the link means and acting between the B'- and B"-axes. With such preferred drive arrangement, the link means most preferably is connected to the base member so as to be pivotal relative thereto with a single degree of freedom in response to drive from the motorized drive train, with the work member connected to the link means so as to be pivotal relative thereto with a single degree of freedom in response to the action of the motorless drive train. It is highly desirable that such drive means is operable simultaneously with rotation of the work head on the A-axis, and with movement of the carrier means and work head relative to the X-, Y- and Z-axes.

The drive means can be applied to the exterior of the work head. However, it is preferred that it be at least in part within the work head, and this can readily be adopted where the link means is of the above described form in which it comprises first and second links.

In one preferred arrangement, the work head has a first and a second wheel means, each mounted co-axially on the B'-axis, and a third wheel means mounted co-axially on the B"-axis. The first wheel means is adapted to be rotated under the action of a drive train of suitable drive means, and coupled to the link means for rotation therewith on the B'-axis. The third wheel means is coupled to the work member for rotation therewith on the B"-axis. The second wheel means is, or is able to be, fixed against rotation relative to the B'-axis, but is coupled to the third wheel means by a drive train which is operable in response to rotation of the link means, to cause rotation of the third wheel means and the work member on the B"-axis relative to the link means.

In the preferred arrangement, the second and third wheel means may be toothed wheels, with the coupling between them provided by a toothed belt or a drive chain extending therearound. Alternatively, the second and third wheel means may comprise gear wheels, with the coupling being provided by a gear train therebetween. Most conveniently, the arrangement is in accordance with the above detailed conditions for achieving zero offset for the work end of the work head. Thus, where the coupling is a toothed belt or a drive chain, the second toothed wheel is twice the diameter of the third toothed wheel to provide a 2:1 drive ratio between the angles of rotation of the link means and the work member. Where the coupling is a gear train, the second and third gear wheels and the drive train are such as to achieve such drive ratio.

Where the link means is of the above described form in which it comprises first and second links, the first link may have an annular collar in which one end of the sleeve portion of the base member is journalled, which defines the first wheel means. In such case, a drive belt or chain, driven by an actuator from within or beyond the base member, may pass around the annular collar, and be operable to rotate the link means. As a consequence of that rotation, the work member is rotated under the action of the driving inter-connection between the second and third wheel means.

Where it is required that the link means and the work member be rotatable under a selected one of two conditions of respective relative rotation, an alternative arrangement is desirable. In one form of suitable alternative, each of the second and third wheel means comprises a pair of co-axial wheel members, such as toothed wheels or gear wheels. In that form, each wheel member of the second wheel means pair is drivingly inter-connected with a respective wheel member of the third wheel means pair, such as in the manner described above, to provide two sets of inter-connected wheel members. The third wheel means pair of wheel members is non-rotatably mounted on the work member such that each wheel of that pair is rotatable with that member. However, each wheel of the second wheel means pair is rotatably mounted on the B'-axis, such as on the base member, and detent means is provided for selectively preventing rotation of one of the wheel members of the second wheel means pair relative to the base member. The arrangement is such that each set of drivingly inter-connected wheel members provides a respective drive ratio for rotation for the link means and the work member, with the detent means being adjustable to engage one or other of the wheel members of the second wheel means pair and thereby bring into operation a required set of drivingly inter-connected wheel members which includes the engaged wheel member.

The detent means may take a variety of forms. However, in one arrangement, it comprises a detent arm movable between respective positions in which it engages an internal keyway of one or other of the wheel members of the second wheel means pair. The detent arm may comprise part of a lever system. In one form, the detent arm is located substantially within the link means, and the lever system includes an actuating lever which extends to the exterior of the work head to enable manual or automatic movement of the detent arm, as required.

For most situations, it is desirable that one set of the drivingly inter-connected wheels achieve a condition of zero offset, as discussed above. However, for added utility, the other set of wheels provides a known offset, where required. Also, as will be appreciated, each of the second and third wheel means may comprise three or more wheels, with the detent means being operable to prevent rotation of any selected one of the wheels of the second wheel means. Proceeding beyond each of the second and third wheel means comprising a pair of wheels increases complexity of the work head and, particularly if more than one known offset is required, a modified arrangement for changing the relative rate of rotation of the link means and the work head is likely to be desirable.

For rotation of the first and second wheel means and the link means on the B'-axis, with resultant rotation of the work member and the third wheel means on the B"-axis, a variety of actuating arrangements can be used. However, the arrangement preferably is one enabling use of a drive train which permits rotation of the work head on the A-axis either with or without simultaneous rotation of the link means and work member on the B'- and B"-axes, respectively. That is, the drive train preferably is such that during rotation of the work head on the A-axis, the drive train can if required simultaneously provide such predetermined rotation on the B'- and B"-axes; while the dive train also is able to provide such rotation on the B'- and B"- axes when there is no rotation on the A-axis.

The drive train preferably is mounted such that when it is not intended to provide rotation on the B'- and B"-axes, the drive train remains in a constant position relative to the work head as the work head is moved by the carrier means relative to the X-, Y- and Z-axes and as the work head is rotated on the A-axis. In one illustrative example, the carrier means has an elongate carrier tube substantially concentric with the Z-axis and to which the base member of the work head is connected. A torque tube extends co-axially within the carrier tube and is adapted to be reversably rotated relative to the carrier tube by a suitable actuator, such as a controlled motor, mounted on the carrier means. Thus, when rotation on the B'- and B"-axes is not being provided, the torque tube is fixed in relation to the carrier tube during movement of the latter relative to at least one of the X-, Y-, Z- and A-axes; the torque tube simply moving in unison with the carrier tube. During rotation on the B'- and B"-axes, the torque tube is rotatable relative to the carrier tube, whether or not the carrier means is moving relative to at least one of those axes. Adjacent the base member of the wok head, the torque tube engages portion of an endless drive belt, such as a toothed drive belt or chain, which passes around the torque tube and around the first wheel means. The arrangement is such that the drive belt or chain transfers rotational drive around the Z-axis to rotational drive, at right angles to that axis, around the B'-axis; the transfer preferably being effected by the guide rollers. Alternatively, the torque tube may engage the first wheel means via a pair of bevel gears therebetween.

The drive train preferably has a coupling means enabling retraction or twisting of the work head relative to the carrier means, such as when the head impacts unintentionally against an object, with such coupling means most preferably remaining engaged on being readily re-engaged in the event of such retraction or twisting. To facilitate retraction or twist of the work head in the event of such impact, the torque tube may have a flexible coupling between an upper drive portion thereof and a lower portion to which the work head is connected. On retraction and/or twisting of the work head, the coupling allows axial and/or radial displacement of the torque tube lower portion with the work head, while the upper portion remains co-axially within the carrier tube and, hence, concentric to the Z-axis. In one arrangement, the flexible coupling may be of a flexible bellows form. Alternatively, a hollow, double universal joint can be used as the flexible coupling.

Reference now is directed to the accompanying drawings in which:

FIG. 1 is a partial perspective view of a preferred form of work head;

FIG. 4 is a section view through the work head of FIG. 1, as internally structured for use in a laser system, showing it in relation to part of a carrier means;

FIG. 4A is on an enlarged scale part of the structure shown in FIG. 4;

Figure 2:
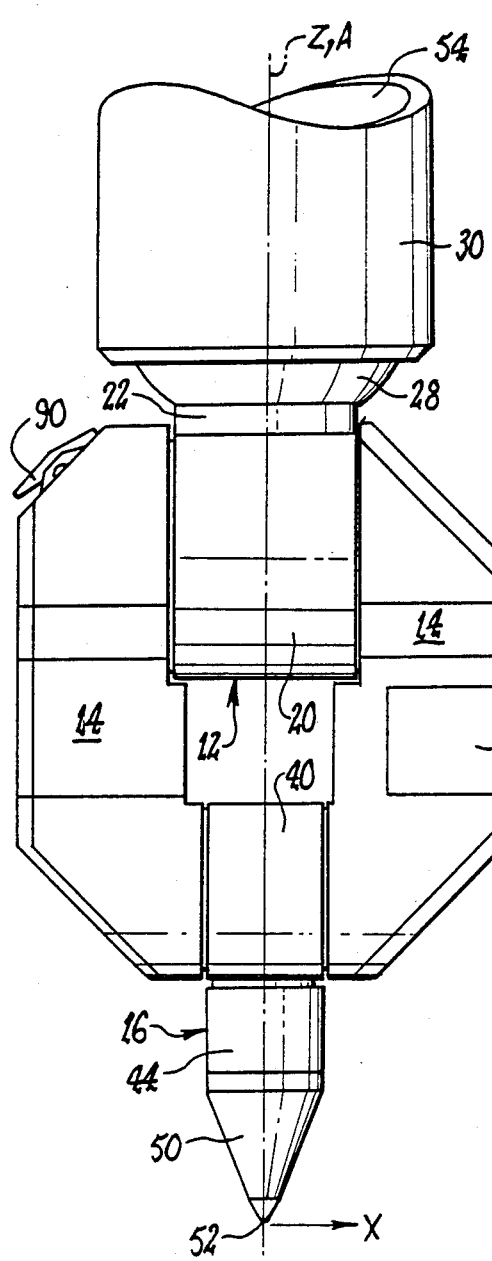
FIG. 2 is a partial front elevation of the work head of FIG. 1.
Figure 3:
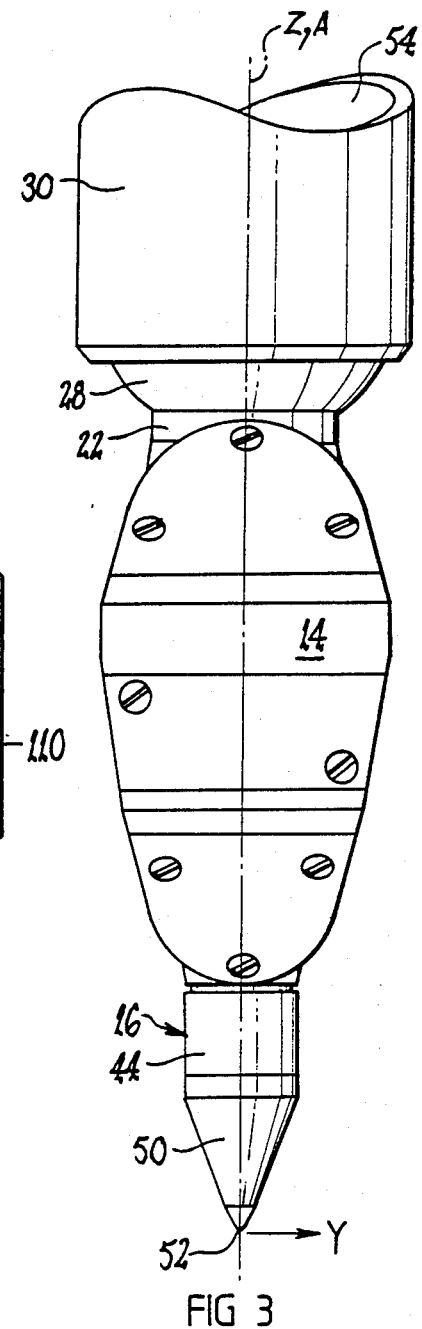
FIG. 3 is a side elevation, taken from the right hand side of FIG. 2.

FIG. 5 corresponds to FIG. 3, showing the head in skeletal outline and illustrating an internal drive arrangement;

FIG. 6 shows an overall light-path for a laser beam within the head as shown in FIG. 4;

FIG. 7 shows a part of the light-path of FIG. 6, according to a modified arrangement;

FIGS. 8A to 8C show the head of FIG. 1 in various configurations for operating on article surfaces of varying orientation under the condition of zero offset;

FIGS. 9A to 9C correspond to FIGS. 8A to 8C, but show the head under the conditions of a given offset;

FIGS. 10 and 11 correspond to FIGS. 4 and 5, but show further detail in relation to one arrangement for actuating the internal drive; and FIGS. 12 and 13 correspond to FIGS. 10 and 11, respectively, but show an alternative arrangement for actuating the internal drive.

With reference to FIGS. 1 to 4, the work head 10 has a base member 12, a link means comprising a parallel pair of link members 14 and a work member 16. Base member 12 has a sleeve portion 20 which at each end is journalled in an end of a respective link member 14 so that the members 14 are pivotable relative to member 12 on axis B'. Member 12 also has a tubular shank portion 22, the bore 24 of which communicates with the bore 26 of portion 20 as shown in FIG. 4. At its end remote from portion 20, shank portion 22 has a part-spherical external surface 28, by which head 10 is connectable to a carrier means of which only carrier tube 30 is shown.

Each link member 14 is of elongate form and defines an internal cavity 32. At each end, cavity 32 of each member 14 opens toward the other member 14 via a respective collar 34,36. Each end of sleeve portion 20 is journalled in a respective collar 34 with rotation of members 14 on axis B' being facilitated by bearings 38.

Work member 16 has a sleeve portion 40 of which each end is journalled in a collar 36, via a bearing 42, so that member 16 is rotatable relative to link members 14, on an axis B'', parallel to axis B'. Member 16 also has a shank portion 44 of which the bore 46 is in communication with bore 48 of sleeve portion 40. At its end remote from portion 40, shank portion 44 carries a nozzle 50. To facilitate using of a distance to workpiece sensor, the nozzle 50 is preferably made of electrically insulating material such as a machinable ceramic.

The overall arrangement is such that, with axis B'' in the same plane as axes B' and Z, and therefore also intersecting axis Z with respect to which shank portion 22 is concentric, shank portion 44 also is concentric with respect of axis Z. Also, the spacing between axes B' and B'' is equal to the spacing between axis B'' and the outlet tip 52 of nozzle 50.

Work head 10 may be connected to tube 30 of a suitable carrier means in the manner shown in FIG. 4. Extending within bore 54 of tube 30, there is provided an annular ring 56. A plurality of longitudinally extending, angularly spaced collect fingers 58 project from ring 56 toward the end of tube 30. Each of fingers 58 is resilient and has a radial projection 60 of a preferably spherical shape located in a respective one of corresponding recesses 62 located around part-spherical surface 28 of base member 12. The resilience of fingers 58 is sufficient to provide a connection between head 10 and carrier tube 30. However, in the event of an impact against head 10, fingers enable head 10 to twist or move inwardly a short distance into tube 30; thereby minimizing risk of damage to head 10. As will be appreciated, head 10 can be manually, or automatically, repositioned in relation to tube 30.

Fingers 58 are resilient so as to be able to flex both radially and circumferentially between surface 28 of base member 12 and bore 54 of tube 30. However, one of fingers 58 is constrained so as to be able to flex radially only, thereby stabilizing head 10 in a given annular relationship with respect to tube 30. Such constraint may, for example, be by radial projections 30a formed on bore 54, and defining therebetween a slot in which the one finger is located.

As shown in FIG. 4A, bore 54 of tube 30 has, at its bottom end, a radial flange 63 which defines an axially facing datum surface 63a, and a radially facing datum surface 63b. Below surface 63a, the radially inner face of flange 63 is of arcuate form so as to be substantially complementary to part spherical surface 28. Also, surface 28 has formed therein an annular groove which defines radial and axially extending datum surfaces 28a and 28b, respectively mating with surfaces 63a and 63b. Projections 60 of fingers 58, when in contact with recesses 62, ensure full contact between datum surfaces 28a and 63a and between datum surfaces 28b and 63b.

In a normal situation, the carrier means is operable to move tube 30 and work head 10 along axis Z, and simultaneously or independently along an X and Y axis in a plane normal to axis Z. Also, the carrier means is operable to rotate tube 30 and head 10 on an axis A co-incident with axis Z. Such movement and rotation, coupled with rotation of link members 14 on axis B' and work member 16 on axis B'', enables head 10 to move in a five-axes arrangement.

For rotation of link members 14 on axis B', a toothed drive belt 64 passes around the external surface of collar 34 of the right hand link member 14 as shown in FIG. 4. Belt 64 is only partially shown in FIGS. 5 and 6, although one arrangement for driving this is shown in FIGS. 10 and 11, while an alternative arrangement is shown in FIGS. 12 and 13. However, with the drive imparted by belt 64 to rotate the right hand link member 14, each of members 14 are rotated together on axis B' by virtue of the connection provided therebetween by work member 16.

Within the left hand link member 14, as seen in FIG. 4 and FIG. 5, there is provided a drive arrangement 66 for rotation of work member 16 on axis B", simultaneously with rotation of members 14 on axis B'. Arrangement 66 includes a first pair of toothed wheels 68,70 mounted on portion 20 of base member 12; a second pair of toothed wheels 72,74 mounted on the adjacent end of sleeve portion 40 of work member 16; and lever system 76. Wheels 68,70 are co-axially mounted for separate rotation on axis B', while wheels 72,74 are co-axially mounted on axis B" but fixed against rotation relative to portion 40. Innermost wheels 68,72 are interconnected by a toothed belt 78, while a further such belt 80 inter-connects outermost wheels 70,74.

Lever system 76 includes a detent arm 82 pivoted on pin 84 for movement between respective positions in which is engages and prevents rotation of one or the other of wheels 68,70. System 76 also includes a bell-crank lever 86 pivotally mounted on pin 88 and having a rocker arm 90 located exteriorly of work head 10. A link 91 pivotally connects arm 82, intermediate its ends, to the end of lever 86 remote from arm 90, by respective pins 93,94. The arrangement is such that, depressing one end of arm 90 causes pivoting of lever 86 and, via link 91 movement of the free end of arm 82 to engage, and prevent rotation of, one of wheels 68,70. Depressing the other end of arm 90 reverses the pivoting of arm 82 to engage and prevent rotation of the other one of wheels 68,70. In each case, the engaged wheel is prevented from rotating on axis B' and it therefore is fixed relative to base member 12; while the non-engaged wheel is free to rotate on that axis relative to member 12.

On a radially inner surface, each of wheels 68,70 has an axially extending keyway 94, as shown in FIGS. 11 and 13 for wheel 70. Engagement between the free end of arm 82 with a required one of wheels 68,70 is by means of that end locating in the respective keyway 94. A change from engagement of the free end of arm 82 with one wheel to engagement with the other wheel is effected when the work head is in a datum position at which the respective keyways 94 are in end to end alignment. Although a plurality of keyways around each wheel can be provided to facilitate such change, there need be only one keyway for each wheel. Alignment of the keyways with the work head in its datum position preferably being effected when links 14 and work member 16 are in an appropriate relationship providing such alignment. The datum position of the work head preferably is such that axes Z, B' and B" are co-planar, with shank portion 44 of work member 16 concentric with respect to the Z-axis. The arrangement may be such that, with the datum position attained, head 10 is raised along the Z-axis to engage the relevant end of arm 90 with a contact member to effect a change in engagement.

With rotation of link members 14 on axis B', under the action of belt 64, base member 16 is moved with the ends of link members 14. However, with wheel 68 engaged by arm 82, wheel 72 is constrained by toothed engagement with belt 78 to rotate on axis B" with corresponding rotation of work member 16 on that axis. Similarly, with wheel 70 engaged by arm 82, wheel 74 is constrained by belt 80 to rotate on axis B" with rotation of member 16. In each case, the rotation of member 16 is in the opposite direction to rotation of link members 14. Also, while wheels 72,74 rotate in unison, the one of wheels 68,70 which is not engaged by arm 82 simply rotates freely under the action of the respective one of belts 78,80.

In the described arrangement, arm 82 is shown as extending diametrically within wheels 68,70 and, with rotation of link members 14 on axis B', arm 82 will remain in such diametral relationship but be rotated with the one of wheels 68,70 with which it is engaged. There thus will be a torque applied to the end of arm 91 connected to arm 82 by pin 93, although the other end of arm 91 is constrained against rotation by the single degree of freedom permitted by pin 88. To allow for this, arm 91 is split intermediate its ends, with the two parts of arm 91 being joined by a pin 91a co-axial with axis B'. Thus, the part of arm 91 connected to arm 82 by pin 93 is able to rotate on pin 91a, relative to the part of arm 91 connected to arm 86 by pin 94.

Wheel 68 is twice the diameter of wheel 72. Also, as indicated above, the spacing between axes B' and B" is equal to the spacing of nozzle tip 52 from axis B". The consequence of this is that, when wheel 68 is engaged by arm 82, member 16 is rotated in relation to the link members 14 through twice the angle of rotation of link members 14 in relation to the base member 12, such that zero offset is obtained with nozzle tip 52 remaining on axis A. Wheel 70, shown as being of similar diameter as wheel 68, is more than twice the diameter of wheel 74. Thus with wheel 70 engaged by arm 82 a given offset is achieved when, due to rotation of link members 14, axis B" is out of co-planar relationship with axes B' and A. Wheel 70 is shown as four times the diameter of wheel 74 to provide a substantial offset.

FIGS. 8A to 8C show relative pivoting of link members 14 and work member 16 with zero offset, achieved by wheel 68 being engaged by arm 82. FIG. 8B shows the relative position of members 14,16 when axis B" is co-planar with axes B' and A, such as required in causing work head 10 to move in the direction of the X, Y and/or A axes over a surface portion 95 of a workpiece which is perpendicular to the Z axis. From that co-planar relationship, and with wheel 68 still engaged, members 14 can be rotated in either direction as respectively shown in FIGS. 8A and 8C, with opposite rotation of member 16 and retention of nozzle tip 52 on axis Z throughout that rotation. Thus, work head 10 is able to move over respective surface portions 96,97 of the workpiece which are inclined to portion 95, simultaneously with movement in the X, Y, Z and/or A axes.

FIGS. 9A to 9C show operation as in FIGS. 8A to 8C, but with a given offset achieved by wheel 70 being engaged by arm 82. FIG. 9B is analogous to that of FIG. 8B; while FIGS. 9A and 9C show rotation of members 14 and 16 to enable work head 10 to move over surface portions 98,99 which are parallel with, or at a small angle to, the Z axis. Movement as in FIGS. 9A or 9B can be simultaneous with movement on the X, Y, Z and A axes.

As shown in FIGS. 8A to 8C, nozzle tip 52 is on the Z, A axes in each case due to the zero offset; while this condition prevails for all angles through which members 14,16 are rotatable. However, a comparison of FIGS. 8A to 8C with FIGS. 9A to 9C will make clear that, as the angle of surface portions 96,97 approach that of surface portions 98,99 there is reached a stage at which nozzle tip 52 can not be applied to such surface with zero offset. It thus becomes necessary to change to a given offset such as shown in FIGS. 9A to 9C, in which tip 52 projects beyond any part of members 14 or carrier tube 30 which is likely to contact surface 98,99 and prevent engagement of the surface by nozzle tip 52.

In the arrangement of FIG. 4, in which work head is intended for use in a laser system, a laser beam is able to pass from a generating source (not shown), axially along tube 30 to head 10. The beam passes axially through bore 24 and is reflected from axes Z, A along axis B' by mirror 100 mounted in bore 26 at 45° to axes A and B'. Within the right hand link member 14, the laser beam is reflected by mirror 102 which is mounted at 45° to axis B'; and rotatable on that axis with that member 14. From mirror 102 the beam passes along cavity 32, parallel to axis A, to mirror 104 which is at 45° to axis B''. From mirror 104, the beam passes along axis B'' to mirror 106, mounted at 45° to axes B'' and A and rotatable with work member 16. Mirror 106 reflects the beam so as to pass axially along bore 46 to emerge from nozzle tip 52.

A focussing lens 108 is positioned in cavity 32, intermediate mirrors 102,104. Lens 108 intersects the light path of the laser beam for focussing that beam over the remainder of the light path Lens 108 is mounted within a removable section 110 of the right hand link member 14 such that, if required, it can be replaced by an alternative lens 112 shown in broken outline and extending across bore 46. Lens 108 is of longer focal length than lens 112; although nozzle 50 also is removable to enable it to be replaced by a longer nozzle consistent with the focal length of lens 112, if required. However, it will be appreciated that use of a longer nozzle will result in work head 10 not being able to be used in the zero offset condition until nozzle 52 is again fitted.

FIG. 6 shows the laser beam 114 as it passes through work head 10 as fitted with lens 108. As shown, beam 114 is substantially parallel upstream of lens 108, and thereafter narrows. FIG. 7 shows portion of beam 114 through head 10 as fitted with lens 112. The beam is parallel upstream of lens 112, and tapers thereafter. While the overall path length preferably is the same as shown in FIGS. 6 and 7, lens 112 may be such as to provide a greater length accommodated by a longer nozzle.

FIGS. 10 and 11 show one system for rotating link members 14 and, via drive arrangement 66, for simultaneously rotating work member 16. In that system, there is a hollow torque tube 120 which extends co-axially in carrier tube 30 and has one end rotatably journalled in bore 24 by bearings 122. The other end of tube 120 is coupled to a drive motor, not shown, mounted on the carrier of which tube 30 forms part. The arrangement is such that tube 120 and its motor is moveable with the carrier; with tube 120 reversibly rotatable relative to tube 30 by actuation of that motor.

Torque tube 120 has a bellows type of coupling 124 which is flexible to accommodate movement of head 10 in the event of an impact against head 10. That is, coupling 124 enables head 10 to twist or move into tube 30 under an impact which at least partially disengages projections 60 from recesses 62 in part-spherical surface 28.

On the end of shank portion 22 of base member 12 remote from sleeve portion 20, there is provided a number of limit switches 126 from which actuating levers 127 depend for control of engagement of projections 60 in recesses 62. Also, on the adjacent end of shank portion 22, support arms 128 project intermediate tubes 30, 120. Arms 128 carry guide rollers 130 for each run of endless toothed belt 64, to enable belt 64 to pass around tube 120. A toothed ring 132 concentrically mounted on tube 120 is engaged by belt 64; the arrangement being such that rotation of tube 120 on axis A, around axis Z, is converted by belt 64 to rotation on axis B' imparted via collar 34 to link members 14.

A simplified, alternative system for rotating members 14 is shown in part in FIGS. 12 and 13. In that alternative system, belt 64 simply passes along tube 30 to a toothed wheel (not shown) on the output shaft of a motor mounted on the carrier of which tube 30 forms part. The output shaft of that motor preferably has its axis at right angles to and intersecting the Z axis. The motor is mounted on the carrier for rotation therewith, and is operable to provide direct drive for rotating members 14, as required, via belt 64.

In use of head 10 in a laser system, it is necessary that mirrors 100,102,104 and 106 and lens 108 be prevented from being over-heated by the laser beam. A cooling stream of pressurizing gas readily is able to be supplied along tube 30, bores 24, 26 and cavity 32 for cooling mirrors 100,102 and the upstream surface of lens 108; with gas for this purpose being vented through an aperture (not shown) such as in the right hand link member 14. Suitable ducting in the right hand and/or left hand link member 14 can be provided for the supply of cutting assist gas to mirrors 104,106 and the downstream surface of lens 108. Also, if lens 112 is provided instead of lens 108, pressurising gas can readily be provided for all mirrors along the right hand link member 14 and the upstream surface of lens 112; with a bypass duct in shank portion 44 enabling application of cutting assist gas to the downstream surface of lens 112. Moreover suitable ducting can enable pressurising or cutting assist gas to be applied, if required, to the rear face of each of mirrors 100, 102, 104 and 106. In each case, the pressurising and/or cutting assist gas can be pre-cooled, if required.

The work head of the invention facilitates operation with zero offset, resulting in the speed of the carrier in the X-Y plane being equal (within the influence of Z-axis movements) to the required nozzle tip speed against a workpiece. Moreover the head enables simplification of programming for a sequence of movements when such condition is used. Also, the head can enable operation with a chosen degree of offset, where required by a surface of a workpiece, and a programmable control system can allow for the offset and variation in the degree of offset, such as by resolving the offset into its resultant components on the X, Y and Z axes.

While using a programmed path of the workhead over an actual complex workpiece which can slightly deviate from the programmed path, with detection of deviations by a distance sensor, the programmable control system can allow minor adjustments to the path of the deviations by similarly resolving them into their resultant components on the X, Y and Z-axes and, if need be, by adjusting A-, B'- and B''-axes.

The work head enables 360° rotation on the A axis; while rotation of the link members on axis B' can be through an angle of up to about 180° and rotation of the work member on axis B'' can be through an angle in excess of 180°. The compact construction of the head enables its use with zero offset in a wide variety of situations while, in the symmetrical form using two link members, the overall volume of revolution is not increased although the structure of the head is of increased stability. Location of a laser beam focussing lens in the or one link member permits the use of a longer focal length lens in an arrangement in which mechanical link lengths can be reduced. However, such lens positioning arrangement can be such as to permit a change to a shorter focal length lens after the final reflecting mirror, if required.

Finally, it is to be understood that various alterations, modifications and/or additions may be introduced into the constructions and arrangements of parts previously described without departing from the spirit or ambit of the invention.

We claim:

1. A work head for an automated machine by which a work medium is able to be applied to a surface of a work piece, the work head having a base member by which it is connectable to carrier means of the machine for lateral movement of the work head parallel to an X-Y plane of a three-axes co-ordinate system, for longitudinal movement of the work head parallel to the Z-axis of that system and for rotating the work head on an A-axis parallel to the Z-axis; link means connected to the base member so as to be pivotable relative to the base member on a B'-axis parallel to the X-Y plane; a work member connected to the link means so as to be pivotable relative to the link means about a B''-axis, spaced from and parallel to the B'-axis, the work member defining a path by which the work medium is able to pass from a source thereof to an outlet defined at a work end of the work member for application to the work piece surface, which outlet is spaced from the B''-axis by substantially the same distance as the spacing between the B'- and B''-axes; and drive means enabling reversable pivoting of the link means on the B'-axis relative to the base member and reversable pivoting of the work member on the B''-axis relative to the link means; the arrangement being such that:

(i) the drive means is operable to reversibly pivot each of the link means and the work member, on the respective one of the B'- and B''-axes, in opposite directions and with pivoting of the work member relative to the link means through substantially twice the angle of pivoting of the link means relative to the base member; and (ii) the work end at which the outlet of the work member is provided is positioned such that, with the link means and the work member positioned so the Z-, B'-and B''-axes are substantially co-planar, the work end is substantially centered on the Z-axis, whereby the work end is able to maintain zero, offset with respect to the Z-axis despite rotation of the work head on A-axis and said pivoting on the B'- and B''-axes.

2. A work head according to claim 1, wherein drive means is operable in a selected one of at least two conditions, the drive means in a first of said conditions being operable to reversibly pivot the link means and work member simultaneously in said opposite directions with pivoting of the work member through substantially twice the angle of pivoting of the link means; the drive means being operable in at least one further condition to pivot the link means and the work member simultaneously such that the work end of the work member has a positive offset with respect to the Z-axis during rotation of the work head on the A-axis and said pivoting on the B'- and B''-axes.

3. A work head according to claim 1, wherein the work medium passes through the base member, the link means and the work member to the outlet of the work member, the medium within the base member passing along the Z-axis and then along the B'-axis to the link means, the medium within the link means passing along a line laterally offset from the Z-axis, and the medium within the work member passing along the B''-axis towards the Z-axis and then along a line co-planar with the Z-axis to issue from the outlet.

4. A work head according to claim 1, wherein the base member has a sleeve portion substantially concentric with respect to the B'-axis and a shank portion extending laterally from the sleeve portion and substantially concentric with respect to the Z-axis; the base member being connectable to said carrier means at an end of said shank portion remote from said sleeve portion, and said link means being connected to at least one end of said sleeve portion by a journal coupling means therebetween.

5. A work head according to claim 4, wherein said end of the shank portion remote from said sleeve portion has a part-spherical outer surface by which said end is connectable to the carrier means.

6. A work head according to claim 5, wherein the said remote end is adapted to be connected to said carrier means by each of a plurality of resilient fingers of the carrier means locating in a respective one of a plurality of recesses provided in said outer surface and spaced angularly around the Z-axis.

7. A work head according to claim 1, wherein the link means has a link offset to one side of the Z-axis and having opposed ends thereof connected to the base member and the work member by respective journal couplings concentric with respect to the B'- and B''-axes.

8. A work head according to claim 4, wherein the link means has a link offset to one side of the Z-axis and having opposed ends thereof connected to the base member and the work member by respective journal couplings concentric with respect to the B'- and B''-axes; the journal coupling concentric with respect to the B'-axis connecting the link portion to one end of the sleeve portion of the base member.

9. A work head according to claim 7, wherein the link means has a further said link offset to the other side of the Z-axis, the links being in substantially parallel spaced relation.

10. A work head according to claim 1, wherein the work member has a tubular body portion substantially concentric with respect to the B''-axis and nozzle portion extending laterally from the body portion in a plane containing the Z-axis, the link means being connected to at least one end of the body portion by journal coupling means therebetween.

11. A work head according to claim 1, wherein the drive means is adapted to receive drive from a motorized drive train operable via drive coupling means to pivot the link means on the B'-axis, with simultaneous pivoting of the work member on the B''-axis being by a motorless drive train of the drive means responsive to rotation of the link means.

12. A work head according to claim 11, wherein the drive means includes first and second wheel means each mounted co-axially on the B'-axis, the first wheel means being rotatable under the action of the motorized drive train and coupled to the link means for rotation therewith on the B'-axis, the second wheel means being fixed against rotation relative to the B'-axis, the motorless drive train including third wheel means mounted on the work member co-axially with respect to the B''-axis and coupled to the second wheel means to cause rotation of the third wheel means and the work member on the B''-axis in response to rotation of the link means.

13. A word head according to claim 12, wherein each of the second and third wheel means are coupled by a positive drive train.

14. A work head according to claim 12, wherein each of the second and third wheel means comprises a pair of co-axial wheel members, each wheel member of the second wheel means pair thereof being drivingly coupled to a respective wheel member of the third wheel means pair to provide two sets of inter-connected wheel members, each said set providing a respective drive ratio for rotation of the link means and the work member with one said ratio maintaining zero offset with respect to the Z-axis for the work end of the work member and the other ratio providing a positive offset for said work end, the work head including detent means enabling a selected one of said sets to be brought into operation.

15. A work head according to claim 14, wherein said detent means includes a detent arm movable between respective positions in which it engages one or other of the wheel members of the second wheel means pair thereof to bring the selected set into operation.

16. A work head according to claim 15, wherein the detent arm comprises part of a lever system, the system including an actuating lever located exteriorly of the work head.

17. A work head according to claim 1, for an automated machine for applying to a surface of a work piece a work medium comprising a laser beam, the base member, link means and work member defining successive parts of a light path therein for said beam, there being a series of beam reflecting mirrors positioned along said path such that the beam is receivable from a source along the Z-axis into the base member and reflected from that axis along the B'-axis, the beam then being reflected through the link means in a plane parallel to the Z-axis and from the link means along the B''-axis into the work member, the beam then being reflected in the work member in a plane containing the Z-axis so as to issue from the outlet of the work member; there being a focussing lens in the light path, beyond the B'-axis, for focussing the laser beam for application to a surface of a work piece.

18. A work head according to claim 1, wherein the base member has a sleeve portion substantially concentric with respect to the B'-axis and a shank portion extending laterally from the sleeve portion and substantially concentric with respect to the Z-axis; the base member being connectable to said carriers means at an end of said shank portion remote from said sleeve portion, and said link means being connected to at least one end of said sleeve portion by a journal coupling means therebetween; the work member having a tubular body portion substantially concentric with respect to the B''-axis and nozzle portion extending laterally from the body portion in a plane containing the Z-axis, the link means being connected to at least one end of the body portion by journal coupling means therebetween; and the link means has first and second laterally spaced links each on a respective one of opposed sides of the Z-axis, each link having opposed ends thereof connected to a respective end of the base member sleeve portion and the work member body portion by respective journal couplings; and wherein the drive means is adapted to receive drive from a motorized drive train operable via drive coupling means to pivot the link means on the B'-axis, with simultaneous pivoting of the work member on the B''-axis being by a motorless drive train of the drive means responsive to rotation of the link means, the drive means including first and second wheel means each mounted co-axially on the B'-axis, the first wheel means being rotatable under the action of the motorized drive train and coupled to the link means for rotation therewith on the B'-axis, the second wheel means being fixed against rotation relative to the B'-axis, the motorless drive train including third wheel means mounted on the work member co-axially with respect to the B''-axis and coupled to the second wheel means to cause rotation of the third wheel means and the work member on the B''-axis in response to rotation of the link means; the first and second wheel means being adjacent respective ends of the sleeve portion of the base member with the first wheel means coupled to the first link and the second wheel means coupled to said sleeve portion; the second and third wheel means and the drive train therebetween being within the second link with the third wheel means mounted on the end of the work member body portion to which the second link is coupled.

19. A work head according to claim 18, wherein the first wheel means comprises a wheel member rotatable under the action of an external motorized drive for pivoting the link means; and wherein each of the second and third wheel means comprises a pair of co-axial wheel members, each wheel member of the second wheel means pair thereof being drivingly coupled to a respective wheel member of the third wheel means pair to provide two sets of inter-connected wheel members, each said set providing a respective drive ratio for rotation of the link means and the work member with one said ratio maintaining zero offset with respect to the Z-axis for the work end of the work member and the other ratio providing a positive offset for said work end, the work head including detent means enabling a selected one of said sets to be brought into operation.

20. A work head according to claim 18, for an automated laser machine, the base member link means and work member defining successive parts of a light path therein for said beam; the beam being receivable from an external source along the Z-axis so as to pass through the shank portion of the base member, a first mirror being positioned in the sleeve portion of the base member for reflecting the beam along the B'-axis into the first link, second and third mirrors being positioned in the first link for respectively reflecting the beam from the B'-axis to the B''-axis in a plane parallel to the Z-axis and from that plane along the B''-axis towards the Z-axis, a fourth mirror being positioned in the body portion of the work member for reflecting the beam from the B''-axis through the nozzle of the work member in a plane containing the Z-axis; there being a lens in the light path beyond the B'-axis, for focussing the beam for application to a surface of a work piece.

21. A work head according to claim 1, wherein the base member is adapted to be connected to a torque tube extending co-axially with respect to the Z-axis within the carrier means, with rotation of said torque tube imparting drive to said drive means for rotating the link means and the work member on the B'- and B''-axes, respectively.

* * * * *